United States Patent [19]

Kao

[11] Patent Number: 4,815,109
[45] Date of Patent: Mar. 21, 1989

[54] SAMPLING CLOCK SYNCHRONIZATION

[75] Inventor: Ming-Luh Kao, Miami, Fla.

[73] Assignee: Racal Data Communications Inc., Sunrise, Fla.

[21] Appl. No.: 66,361

[22] Filed: Jun. 25, 1987

[51] Int. Cl.[4] ............................................. H04L 7/00
[52] U.S. Cl. ..................................... 375/107; 375/118; 375/120; 370/103; 331/1 A; 331/DIG. 2
[58] Field of Search ............... 375/106, 110, 111, 114, 375/107, 118, 119, 120; 370/100, 103; 371/42, 46, 47; 331/DIG. 2, 1 A

[56] References Cited

U.S. PATENT DOCUMENTS

| | | | |
|---|---|---|---|
| 3,580,499 | 5/1971 | Bauer | 235/201 PF |
| 3,742,145 | 6/1973 | Clark et al. | 370/102 |
| 3,867,579 | 2/1975 | Colton et al. | 370/102 |
| 3,938,086 | 2/1976 | Valbonesi | 270/42 |
| 4,528,521 | 7/1985 | Grimes | 331/1 A |
| 4,580,279 | 4/1986 | Kahn | 370/102 X |
| 4,592,050 | 5/1986 | Bensadon | 270/103 |
| 4,672,299 | 6/1987 | Grimes et al. | 375/111 X |
| 4,737,971 | 4/1988 | Lanzafame et al. | 375/118 |

FOREIGN PATENT DOCUMENTS 1072929 6/1967 United Kingdom .
1535893 12/1978 United Kingdom .
2196450 4/1988 United Kingdom .

OTHER PUBLICATIONS

"A Cycle-Slip Detector for Phase-Locked Demodulators", Gardner, IEEE Transactions on Instrumentation, vol. IM-26, No. 3, Sep. 1977, pp. 251-254.

Primary Examiner—Derek S. Jennings
Attorney, Agent, or Firm—Jerry A. Miller

[57] ABSTRACT

In a method for compensating for differences in a first clock signal's rate and a second clock signal's rate, transmitting voice samples from a first location synchronized to the first clock signal are received at a second location having a second clock for generating the second clock signal. The first clock signal and the second clock signal are compared to determine when a slip of one cycle has occured and it is determined which of the first and second clock rates is greatest. At the second location, the process includes adding a received voice sample for each predetermined number of slips which occur if the second clock is running too fast relative to the first clock, and discard an additional voice sample for each predetermined number of slips which occur if the second clock is running too slow relative to the first clock.

9 Claims, 6 Drawing Sheets

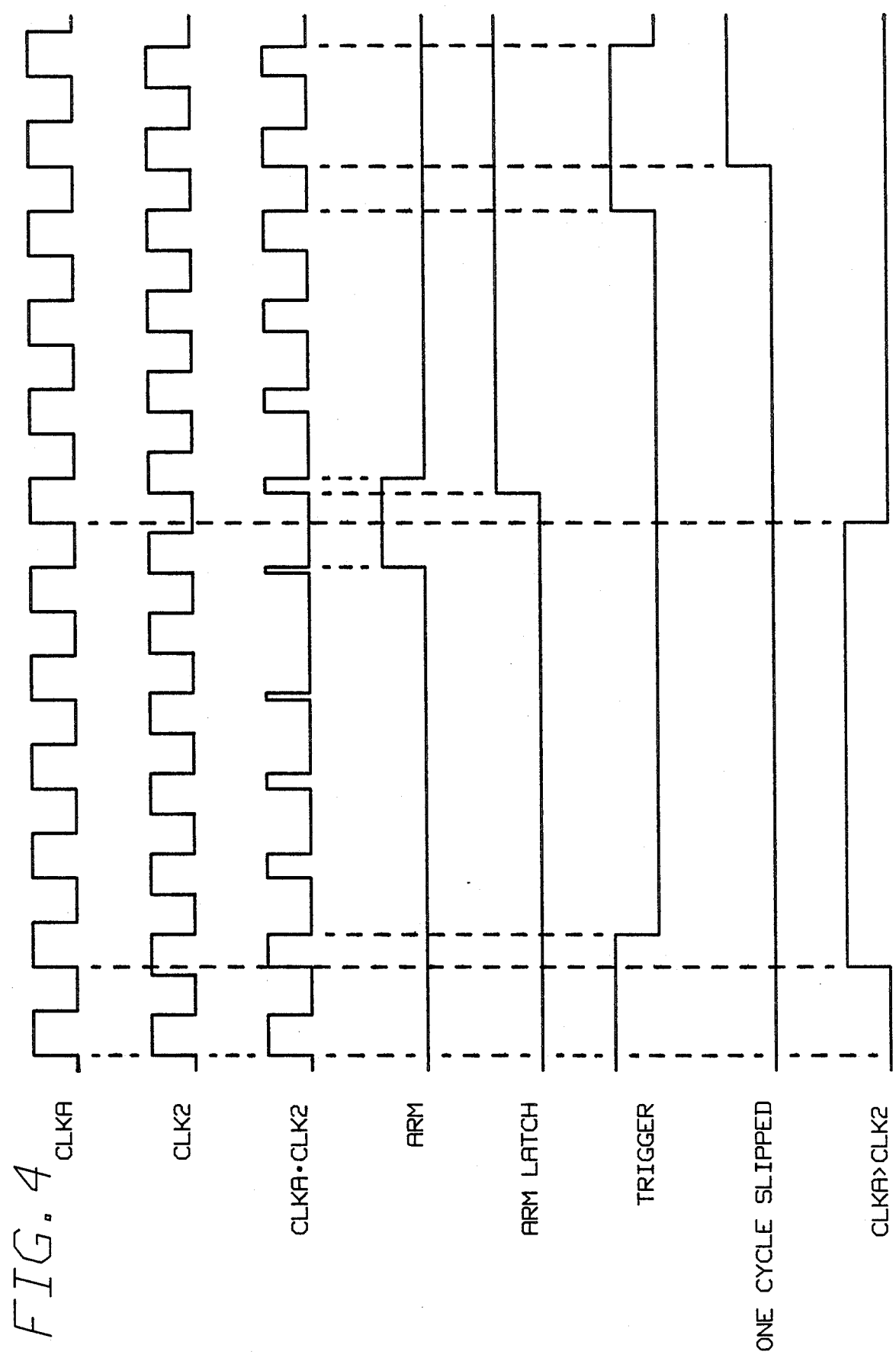

SAMPLING CLOCK SYNCHRONIZATION

BACKGROUND OF THE INVENTION

1. Field of the Invention

This invention relates generally to the field of clock synchronization. More particularly, this invention relates to a method and apparatus for providing clock synchronization in communication systems which are relatively insensitive to absolute timing such as digitized voice systems.

2. Background

In a communication system including a transmitter and a receiver, it is frequently desirable for a transmitter clock to be synchronized to a receiver clock. In some instances, this synchronization may prove inconvenient or costly. For example, consider the system shown in FIG. 1 wherein digitized compressed speech is transmitted from a first location over a communication medium to a second location. In the system shown in FIG. 1, analog speech is applied to the input of an analog to digital (A/D) converter 12 which is clocked by a first clock 14. Clock 14 operates typically at eight (8.0) Khz for sampling speech and produces an 8.0 Khz clock signal referred to herein as CLK1. The digitized samples from analog to digital converter 12 are passed to a compressor 16 which is also clocked by signal CLK1. Compressor 16 operates on the digitized speech signal to reduce its bandwidth by any of a number of known speech compression algorithms. Such speed compression algorithms may include silence detection and deletion and other known bandwidth reduction techniques. The output of compressor 16 is a compressed digital representation of the original analog speech signal which is fed to the data communications equipment (DCE) 18 for transmission over communications medium 20. DCE 18 may be a modem or other communications equipment and provides its own clock signal shown as CLKA back to compressor 16 so that compressor 16 is able to provide the compressed samples in a synchronous manner to DCE 18.

On the receiving end of the data communications medium 20 a similar DCE 22 is provided which receives the transmission from DCE 18 and derives clock signal CLKA from the transmitted data. This clock signal CLKA is delivered to a phase locked loop frequency synthesizer 24 which uses known techniques for synthesizing signal CLK1 from the derived clock signal CLKA. The derived CLKA is used to clock an expander 26 which receives the output of DCE 22 and expands the signal back into a string of digital signals which is then clocked by CLK1 and converted by digital to analog (D/A) converter 28. Digital to analog converter 28 converts the string of digital characters to an analog speech signal which closely resembles the analog speech signal input.

The approach described above, utilizes phase locked loop frequency synthesis to synthesize CLK1 from the derived CLKA from DCE 22. Phase locked loop frequency synthesis, while a relatively mature technology, is not without drawbacks and is somewhat costly in many instances. For example, in many sampled speech systems, it is standard and desirable to have the speech sampling clock operate at 8 Khz. Data communications clock rates are typically a multiple of 2400 hz and at the higher communication rates, which are presently required to support high quality compressed voice, it may be difficult to synthesize 8 Khz from the wide variety of data communication frequencies in common use without requiring a different circuit for each frequency. For example, assume DCE 18 and 22 are high speed modems operating at 14.4 kbps. The clock rate needed for the PCM codec is 1.536 Mhz (the T1 rate) which is a standard PCM clock rate for voice from which 8.0 Khz may be readily derived. However, to derive both 8.0 Khz and 14.4 Khz is somewhat more complex. In one approach, the T1 clock must be multiplied by 3 to obtain a multiple of 14.4 Khz. The multiple of 14.4 Khz is 320, so to derive 14.4 Khz from the T1 rate requires that the T1 clock be multiplied by 3 and divided by 320. While this is certainly possible to do, it requires that either a rather elaborate phase locked loop be used or that a different phase locked loop circuit be used for each data rate. Therefore, a different set of hardware is needed for 19.2 Kbps than for the 14.4 Kbps system described above. Thus, the economy of scale is not fully realized by using conventional phase-locked loop technology.

In addition to the expense required for providing this frequency synthesis, as well as the additional circuit complexity required, the generation of such high frequencies makes electromagnetic emissions more difficult to control and subjects the receiver to the problems associated with lock time, jitter and noise associated with the use of phase-locked loops. The present invention addresses the problem of synchronization of two clocks in certain environments such as digital voice in a manner which avoids such problems and which is easily implemented at very low cost. The circuit operates over a wide range of frequencies without hardware modification by simply supplying a new set of constants to be stored in memory.

SUMMARY OF THE INVENTION

The present invention has the advantage of providing a versatile circuit which can be used for a wide range of frequencies to allow a high volume usage which maintains low cost by implementation in integrated circuit form.

It is an object of the present invention to provide an improved timing synchronization circuit.

It is another object of the present invention to provide a low cost timing synchronization circuit suitable for use in compressed voice communication systems.

It is another object of the present invention to provide an improved control mechanism for control of a voltage controlled oscillator or the like.

It is a further object of the present invention to provide a timing synchronization system which is easily utilized in systems having relative insensitivity to absolute timing.

These and other objects and advantages of the invention will become apparent to those skilled in the art upon consideration of the following description.

In one embodiment of the present invention, an improved apparatus for use in compensating for differences in frequency between a first clock and a second clock, includes a comparing circuit for determining which of the first and second clocks is operating at a higher frequency and for producing and output indicative thereof. A slip detector determines when a complete one cycle slip has occurred between the first and the second clocks. A clock compensation circuit compensates for differences in the clock frequencies responsive to the slip detector circuit and the comparing circuit.

In another embodiment of the present invention, an improved method for compensating for differences in a first clock signal's rate and a second clock signal's rate, voice samples are transmitted from a first location synchronized to the first clock signal are received at a second location having a second clock for generating the second clock signal. The first clock signal and the second clock signal are compared to determine when a slip of one cycle has occurred and it is determined which of the first and second clock rates is greatest. At the second location, the process includes inserting an additional voice sample each time a predetermined number of slips occur if the second clock is running too fast relative to the first clock, and disregarding a received voice sample each time a predetermined number of slips occur if the second clock is running two slow relative to the first clock.

The features of the invention believed to be novel are set forth with particularly in the appended claims. The invention itself, however, both as to organization and method of operation, together with further objects and advantages thereof, may be best understood by reference to the following description taken in conjunction with the accompanying drawings.

DESCRIPTION OF THE DRAWINGS

FIG. 4 shows a timing diagram of the slip detector of FIG. 3.

DETAILED DESCRIPTION OF THE INVENTION

Figure 1:
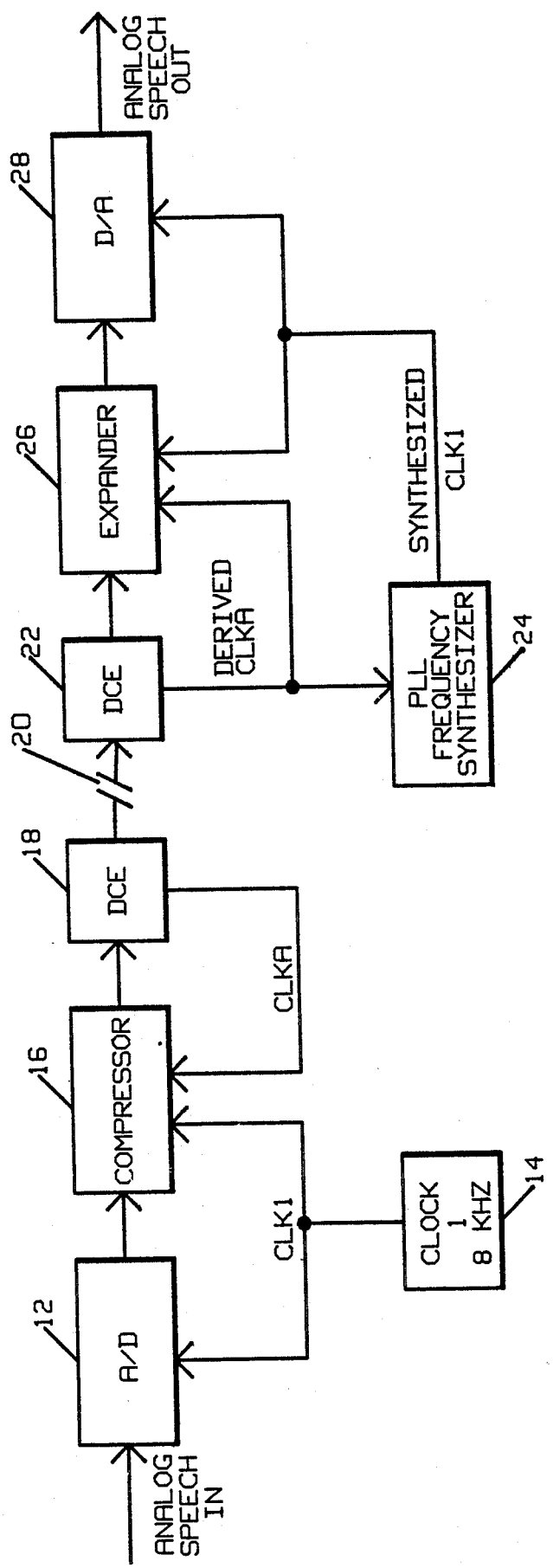
FIG. 1 shows a clock synchronization system using a phase locked loop frequency synthesizer.
Figure 2:
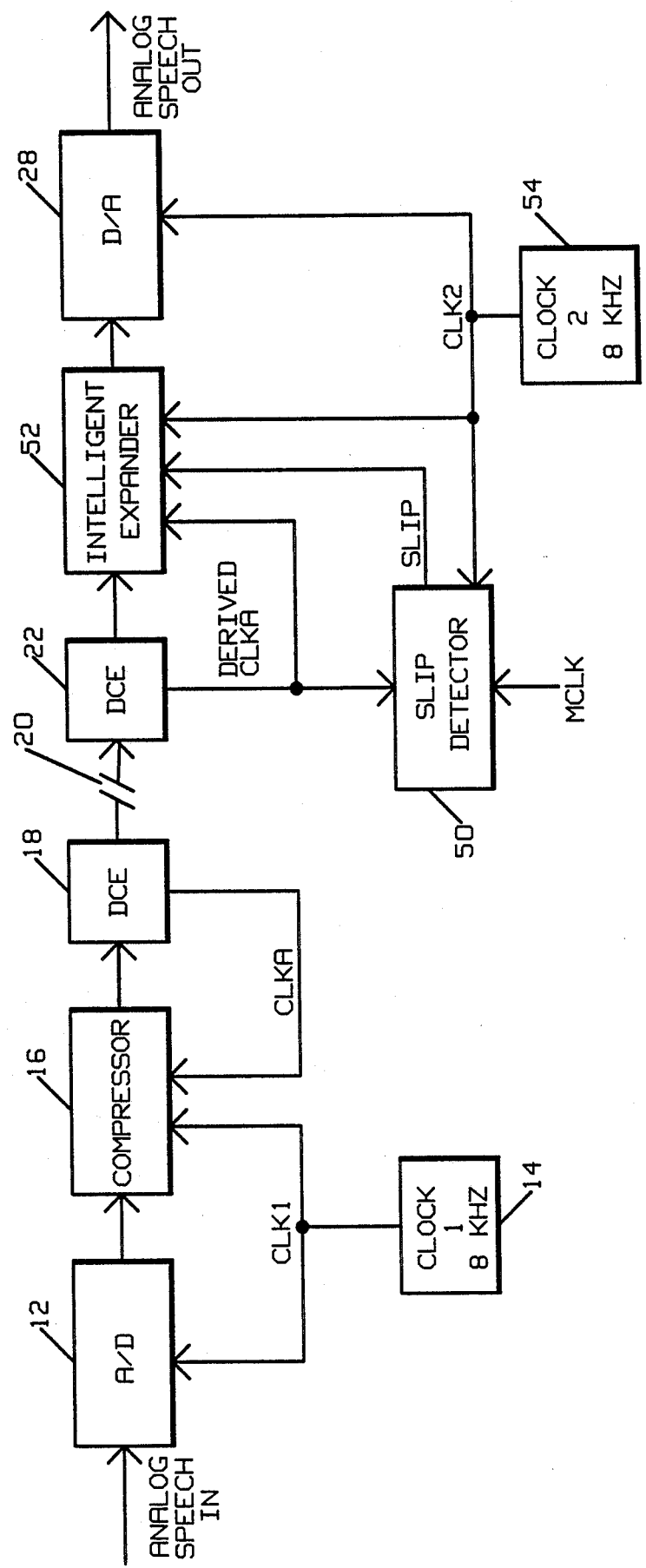
FIG. 2 shows a clock synchronization system using the slip detector of the present invention.

Turning now to the FIGURES in which like reference numerals designated corresponding or similar parts in each of the several views and in particular to FIG. 2, a system analogous to that of FIG. 1 is shown in which the present invention is utilized instead of a phase locked loop to synchronized the transmitter and receiver clock. The transmission side of the communication channel 20 may be essentially identical to that shown in FIG. 1. On the received side however, the derived CLKA is provided to a slip detector 50 as well as to an intelligent expander 52. A second clock 54 is also provided which produces a local 8 Khz signal which is used to clock the digital to analog converter 28. The clock signal CLK2 from clock 54 is also provided to the intelligent expander 52 and the slip detector 50. Intelligent expander 52 may be a microprocessor or microcomputer based expander (as may be expander 26 of FIG. 1).

Slip detector 50 produces a signal SLIP which indicates that a one cycle slip has occurred between the derived clock A (CLKA) and signal CLK2. Intelligent expander 52 utilizes this signal SLIP to make appropriate adjustments to the signal from DCE 22 in the expansion process. The present invention makes a determination of the error in the receiver clock compared to the transmitter clock, using the transmitter clock as a reference. If the receiver clock is running too slow relative to the transmitter clock, the intelligent expander 52 will throw away a sample of data from DCE 22 whenever the error, as measured by comparing the number of accumulated slops with the number of slips which should have occurred, equals or exceeds the duration of one sample. Preferably in the case of speech, the intelligent expander will wait for a period of silence in the speech to throw away a sample of silence. If on the other hand, the received clock is running too fast compared to the transmitting clock, intelligent expander 52 will repeat a sample of the signal from DCE 22 whenever the accumulated error equals or exceeds the duration of one sample. Similarly the repeated sample may be a period of detected silence, but in the case of speech that is not absolutely necessary. In the preferred embodiment, slip detector 50 is also provided with a signal shown as MCLK. This is also a clock signal which is conveniently available to the receiver and may for example be the clock signal for the microprocessor based intelligent expander 52. Signal MCLK may be most any conveniently available clock signal which is much greater in frequency than signals CLK2 and CLKA.

For purposes of this document a slip will be defined as follows. Two clock signals of somewhat similar frequency are compared by observing their behaviour over time. At some point in time their leading or trailing edges will be close together and approximately coincide. With each passing clock cycle, the leading edges of the two clocks will get farther apart (the faster clock's leading edge leading the slower clock's leading edge) and then begin to get closer together again. When one complete cycle of this action has occurred so that the leading edge of the faster clock passes the leading edge of the slower clock, a slip is considered to have occurred. Another slip occurs when the leading edges once again pass. Analogous definitions can be made for non-rectangular clock waveforms.

Several techniques will occur to those skilled in the art for implementing this. The following preferred technique takes into account any appropriate frequency relationship between CLK2 and derived CLKA and is formulated to avoid real number mathematics in favor of integer math which is more easily and rapidly handled by a computer. In practice, a wide range of differences between the two clock frequencies are possible without adverse effects on the operation. Differences of 25% or more in the clock frequencies may be readily handled by the particular circuit shown. By way of example of the process of intelligent expander 52, consider a system wherein CLKA and derived CLKA are running at approximately 7200 Hz (one half of the 14.4 Kbps data rate of DCE 18 and 22).

In this example assume:

$CLKA_0$=the nominal frequency of CLKA=7200 Hz　　　(1)

$CLK2$=8000 Hz　　　(2)

and define the clock ratio:

$C_2/C_1 = CLK2/CLKA_0 = 800/7200$　　　(3)

so that if both numerator and denominator are divided by their least common divisor:

$$C_2/C_1 = 10/9 \quad (4)$$

so we set:

$$C_2 = 10 \quad (5)$$

$$C_1 = 9 \quad (6)$$

Now define:

$K_0 = CLKA_0 - CLK2 =$ the nominal frequency difference between the two
clocks $= 7200 - 8000 = 800$ (7)

Now define an accumulated slip count per second which is the equivalent of:

$$K = CLKA - CLK2 = C\text{-}LKA_0 + \Delta - CLK2 = \Delta - 800 \quad (8)$$

where $$\Delta = CLKA - CLKA_0 \quad (9)$$

where $\Delta$ is the error in CLKA when compared to the nominal $CLKA_0$. For this example assume $CLKA = 7200.9$ Hz so $\Delta = 0.9$ Hz. But, note that K is the output of a slip counter so that fractional values are not read but accumulate over time.

Now define a scaled correction count:

$$L_n = (K_0 - K) \cdot C_2 + L'_{n-1} \quad (10)$$

(where $L'_{n-1}$ is the residue left over from the previous iteration of these equations.)

Now define the sample correction factor:

$$M_n = \text{INT}(L_n/C_1) \quad (11)$$

(where INT(X) equals the integer part of real number X) and define the residue:

$$L_n' = L_n - C_1 \cdot M_n \quad (12)$$

To understand the relationship among these equations, consider the operation of a portion of the expander 52 as illustrated in Table 1. In these equations, subscripts have been used for L, M and L' to indicate the iterative nature of the process. For example, in the case of L, it is dependent on the previously calculated value of L' as indicated by the subscripts of n and n-1 in the above equations. This example case assumes that the intelligent expander reads it's slip counter (K) once every second. The example assumes that CLK1 = 8001 Hz so that CLKA = derived CLKA = (9/10) (8001) = 7200.9 Hz, and thus $\Delta = 0.9$ Hz. CLK2 is 8000 Hz and CLKA = 7200 Hz so $C_2/C_1 = 10/9$. Of course, these particulars are not to be limiting and are presented only by way of example. Further, it is assumed that the clocks start simultaneously at time 0. These assumptions are not to be limiting since other approaches are equally valid.

TABLE 1

| Time Seconds | K | L | M | L' |
|---|---|---|---|---|
| 0 | 0 | 0 | 0 | 0 |
| 1 | −800 | 0 | 0 | 0 |
| 2 | −799 | −10 | −1 | −1 |
| 3 | −799 | −11 | −1 | −2 |
| 4 | −799 | −12 | −1 | −3 |
| 5 | −799 | −13 | −1 | −4 |
| 6 | −799 | −14 | −1 | −5 |
| 7 | −799 | −15 | −1 | −6 |
| 8 | −799 | −16 | −1 | −7 |
| 9 | −799 | −17 | −1 | −8 |
| 10 | −799 | −18 | −2 | 0 |
| 11 | −800 | 0 | 0 | 0 |
| 12 | −799 | −10 | −1 | 0 |

By tracing through the equations above while considering the tabulated data of Table 1, it can be seen that for this particular example, there is no sample deletion at time 1 second because the integer portion of the correction count M is still less than 1. At time 2 seconds, a 1 sample correction is made and the residue L' held until the next iteration. As time goes on between 2 and 9 seconds, the residue value gradually builds up while a single sample is deleted each second. At time 10 seconds, the residue has accumulated to the point that it contributes an extra count to the correction count and 2 samples are deleted. At time 11 seconds, there is once again no correction as in time 1 second. The process repeats itself so that out of each 10 seconds there are 10 sample corrections with no correction on the first and 2 on the last second of each cycle.

Of course, it is likely that in actual use there will be some variation in the actual frequencies of the clocks as a result of temperature changes, jitter, etc. Thus, the above example is somewhat simplified for ease of explanation. However, the procedure outlined will function over a wide variety of circumstances. In the special case of both clocks being of equal nominal frequency, the process simplifies since the constants $K_0 = 0$, $C_1 = C_2 = 1$. So for this special case, the calculations may be simplified. The present method may be implemented using a general purpose signal processor such as the Texas Instruments TMS series and may be changed to meet different frequency requirements by simply changing these constants. The present circuit will readily operate with frequency differences of 25% or more without modification.

Figure 3:
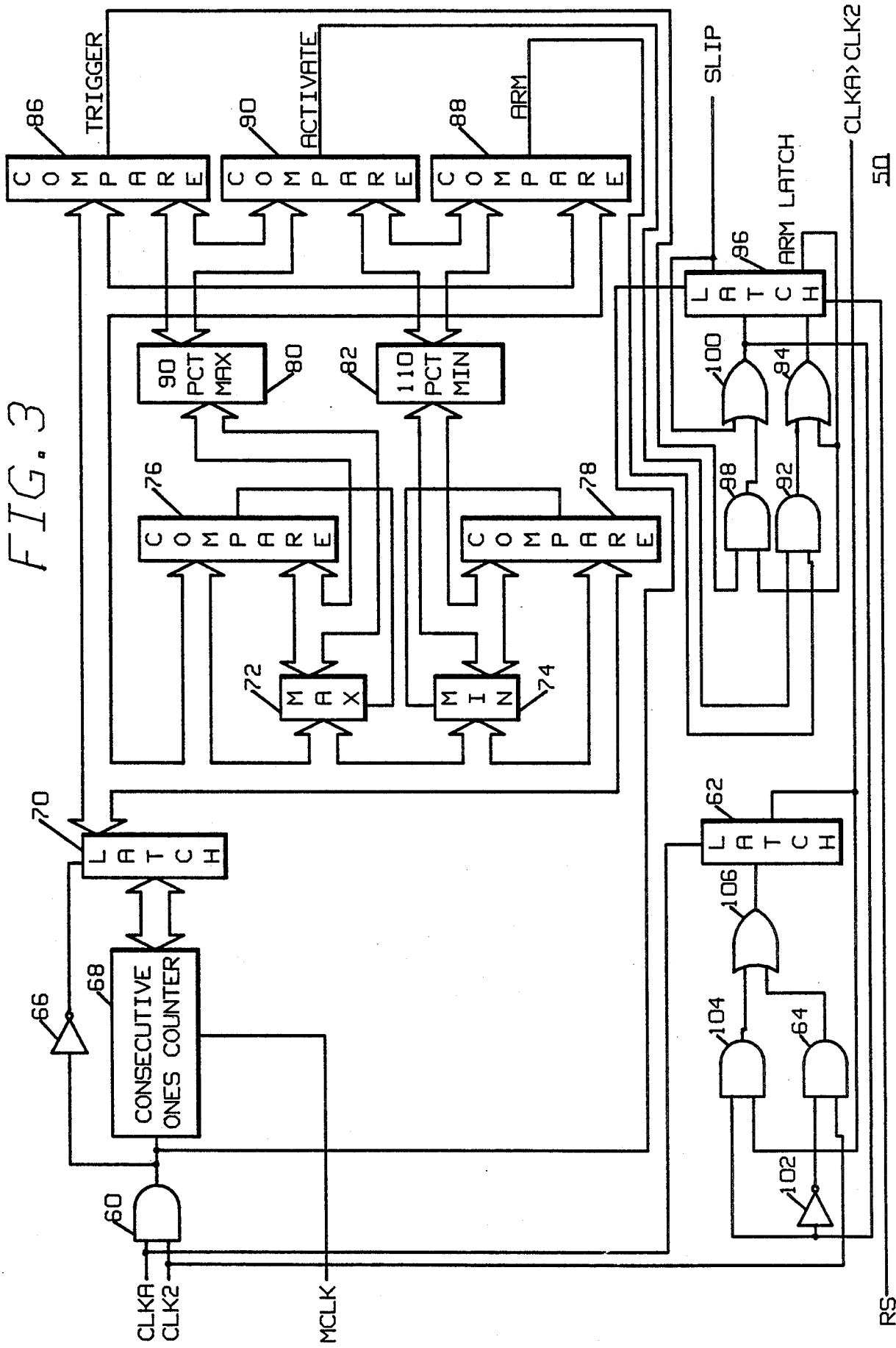
FIG. 3 shows a detailed diagram of the slip detector of the present invention.

Turning now to FIG. 3, an embodiment of the slip detector 50 is shown in detail. Viewing FIG. 4 in conjunction with FIG. 3 may be helpful in understanding the circuit's operation. In FIG. 3, all latches are positive edge triggered with the top input representing a clock input and the bottom input representing a reset input. Signal CLKA is provided to one input of an AND gate 60 as well as the clock input of a latch 62. Signal CLK2 is supplied to the second input of AND gate 60 and a first input of AND gate 64. The output of AND gate 60 is connected to the input of an inverter 66 as well as a consecutive ones counter 68. Consecutive ones counter 68 is clocked by signal MCLK. The output of consecutive ones counter 68 is latched into a latch 70 under the control of inverter 66.

The output of latch 70 is provided to latches 72 and 74 which respectively store the maximum and minimum values from latch 70. The value stored in latches 72 and 74 are compared at comparators 76 and 78 with the output of latch 70 to determine if the output of latch 70 has exceeded the previously stored maximum or minimum value. If it has, the comparators 76 and 78 trigger registers 72 and 74 to store the new value of maximum or minimum value. Circuit 80 computes 90% of the maximum value stored in latch 72 and circuit 82 computes 110% of the minimum value stored in latch 74. Initially, latches 72 and 74 should be loaded with initial values which are updated as the circuit stabilized. Preferably, latch 72 is initially loaded with a very small value and 74 is initially loaded with a very large value so that the normal operation of the circuit can update both latches.

A comparator 86 receives the output of latch 70 and compares that with the output of circuit 80 to determine if the current value is greater than 90% of the maximum value. If so, comparator 86 produces a signal labeled "TRIGGER". Similarly, comparator 88 compares the output of circuit 82 with the output of latch 70 and if the value of the output of latch 70 is lower than 110% of the minimum value, comparator 88 produces a signal "ARM". The outputs of circuits of 80 and 82 are compared at a comparator 90 which produces an output "ACTIVATE" when the circuit has stabilized and there exists a significant difference between the minimum and maximum values.

Signals "ARM" and "ACTIVATE" and ANDed at AND gate 92 the output of which is coupled to one side of an OR gate 94. The output of OR gate 94 is provided to a latch 96 having an "ARM LATCH" output which is coupled back to a second output of OR gate 94. The "ARM LATCH" signal is also connected to AND gate 98 and is ANDed with signal "TRIGGER" on comparator 86. The output of AND gate 98 is coupled to one input of OR gate 100 the output of which is coupled to a second input of latch 96. Latch 96 provides an output "SLIP" which is fed back to a second input of OR gate 100. Latch 96 may be considered to be two one bit wide latches with the "SLIP" output associated with the upper input and the "ARM LATCH" output associated with the lower input and both latches sharing common clock and reset lines. Latch 62 is a one bit wide latch. The remaining latches may be of any desired width, for example 8 bits wide, which is convenient for the desired application.

Circuit 50 must also determine which of CLKA and CLK2 is running faster. This output is obtained from latch 62. The output of OR gate 100 is provided to the input of an inverter 102 as well as one input of an AND gate 104. The second input of AND gate 104 is coupled to the output of latch 62. The output of inverter 102 is connected to the second input of AND gate 64. The outputs of AND gates 64 and 104 are provided to the inputs of OR gate 106 which drives latch 62.

Operation of slip detector 50 is as follows and may be understood by simultaneous consideration of the timing diagram shown in FIG. 4. CLKA and CLK2 are ANDed together at AND gate 60 and the duration of time in which both signals are at a logical 1 is timed by a consecutive 1's counter 68 by simply counting the number of clock cycles of MCLK occurring during the period of time in which the output of 60 is high. This count is delivered to latch 70. After a stabilization period the maximum and minimum counts are stored in 72 and 74 and 90% of the maximum value is generated in 80 and 110% of the minimum value is generated in 82. Whenever the value from latch 70 is greater than 90% of the maximum value, comparator 86 knows that the clocks are near the point of their maximum overlap. Similarly, whenever the value of latch 70 is less than 110% of the minimum value, comparator 88 determines that the clocks are near their minimum amount of overlap. When the minimum amount of overlap is attained, latch 96 is armed and awaits the next point of maximum overlap in the clocks (output trigger). When this occurs, the latch 96 provides output a high output "SLIP", provided "ACTIVATE" is on. The 90% and 110% values are illustrative and may require adjustment in some circumstances.

The circuit of FIG. 3 provides the output "CLKA>CLK2" by noting that at the instant that "SLIP" makes a positive transition, the relative speed of the clocks is given by the instantaneous value of CLK2. This circuit is only needed if the nominal frequencies of CLKA and CLK2 are the same or very close. If CLK2 is low at this point, CLK2 is slower than CLKA and if CLK2 is high at this point. CLK2 is faster than CLKA. By definition, these are the only two cases which are allowed as one will always be faster than the other if a slip has occurred. The operation of this portion of the circuit is best understood by consideration of the previous comments while simultaneously studying FIG. 3 and FIG. 4.

Figure 5A:
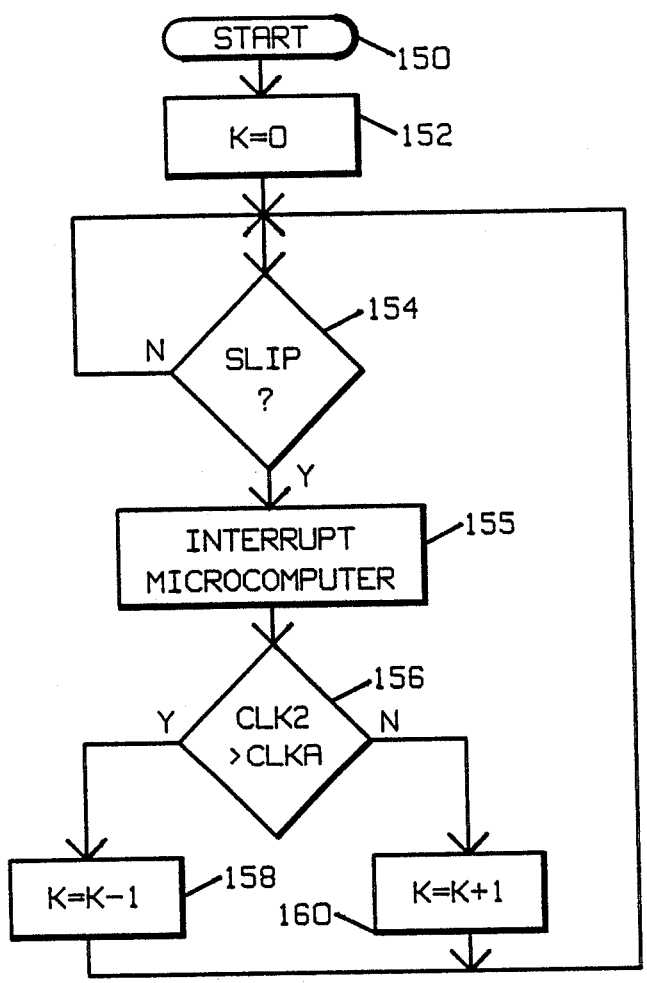
FIG. 5A shows a flow chart of the operation of an interrupt driven slip counter according to one embodiment of the present invention.

Turning now to FIG. 5A, a flow chart of an interrupt driven embodiment of the slip counter operation of the system of FIG. 2 is given. In another embodiment, the microcomputer may poll a counter periodically. For purposes of this discussion, it may be assumed that CLKA=7.2 Khz and CLK2=8.0 Khz. In this embodiment the number of slips which occurs is counted by a microprocessor which implements expander 52. Whenever a slip occurs, the microcomputer is interrupted. Those skilled in the art will recognize many possibilities for implementation of the process of FIG. 5A as well as similar processes. The process begins at 150 and control passes to 152 where the value of the counter K is set equal to zero. A determination is made at 154 as to whether or not a slip has occurred. If not, the process awaits the occurrence of a slip. When a slip has occurred control passes to 155 where the microcomputer is interrupted. At step 156 it is determined whether or not CLK2 is faster than CLKA. If so, control passes to 158 where the slip counter is decremented by 1. Otherwise, the slip counter is incremented by 1 in 160 and control passes back to 154 in either case.

Figure 5B:
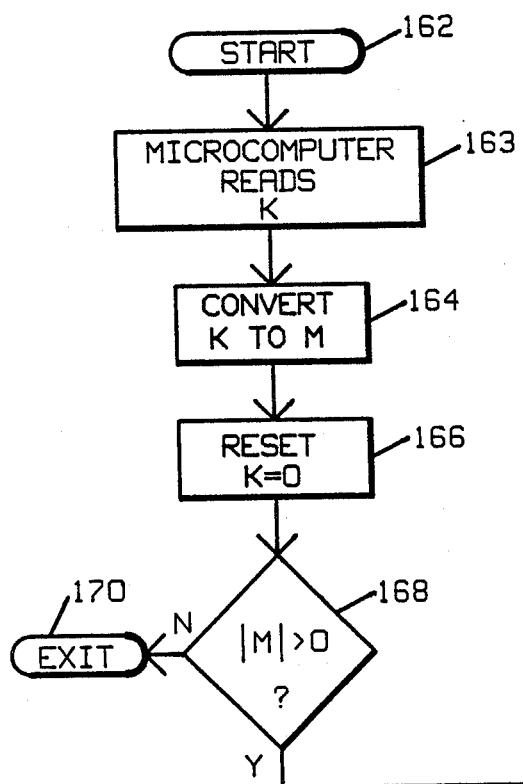
FIG. 5B shows a flow chart of the operation of a clock correction routine according to one embodiment of the present invention.

FIG. 5B is a flow chart describing the operation of the intelligent expander in repeating or throwing away samples to correct the clock. The process starts at 162 and at 163 the microcomputer reads K at predetermined time intervals The microcomputer then performs the conversion of K to M at 164 and resets K to zero at 166. If the absolute value of M is not greater than zero (M=0) the process exits at 170. Otherwise, control passes to 172 where the voice signal is checked for silence. If silence is not detected in 172, the process waits for a silent period. If silence is detected at 172, control passes to 174 where the value of M is checked to determine if samples are to be added or deleted. If the number of samples M is greater than 0, then the last sample is repeated M times at 176 to make the clock correction. If M is less than zero at step 174, control passes to 178 where M samples of silence are thrown away after which control passes to 180 where the procedure is exited.

Those skilled in the art will appreciate that many variations of the present process is possible. For example, rather than accumulating slips and samples to be deleted and then waiting for a period of silence, samples can be thrown away one at a time without seriously effecting the voice quality in most situations. Also, it may not be desirable to accumulate samples in waiting for a silence period in some situations. Other variations will occur to those skilled in the art.

Figure 6:
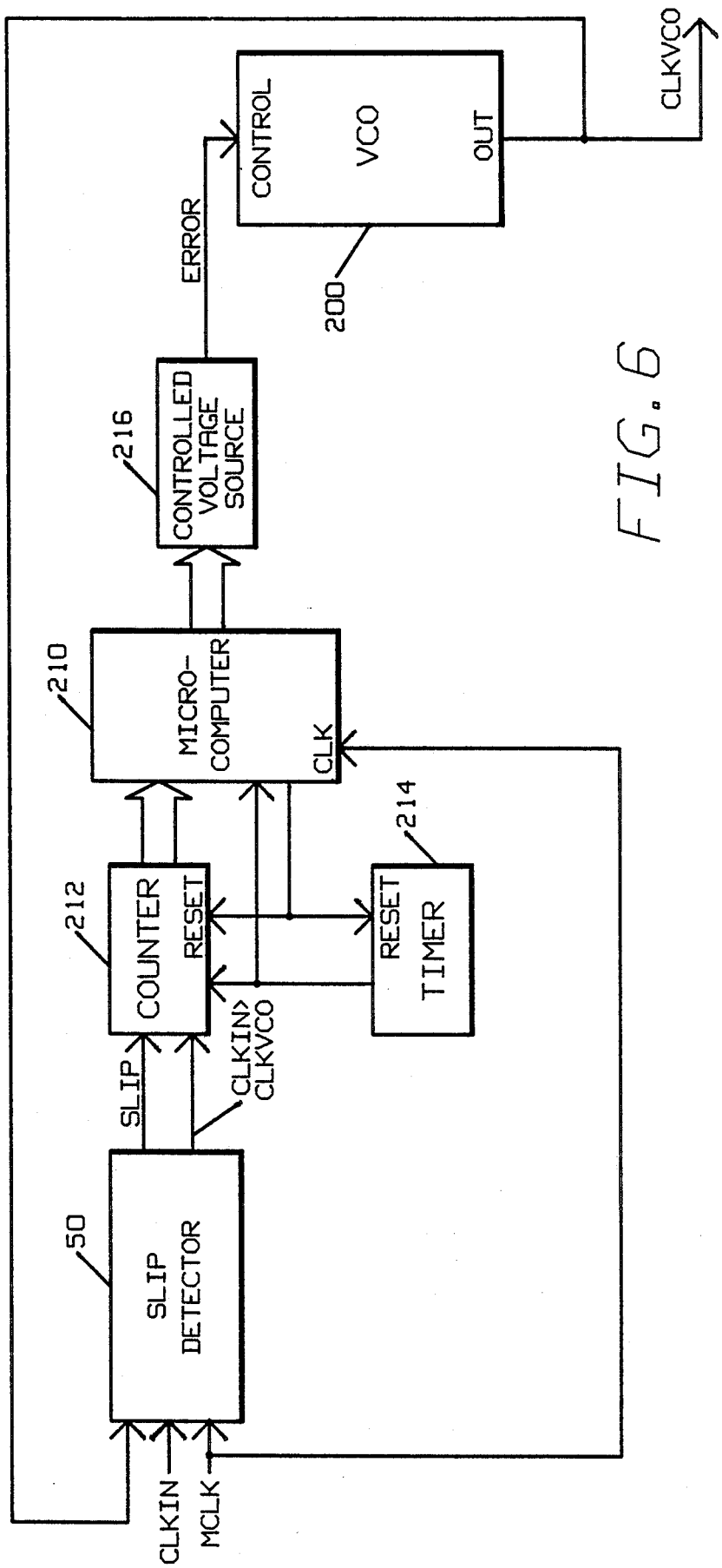
FIG. 6 shows an alternative use of the present invention for controlling the voltage controlled oscillator of a phase locked loop.

The slip detector of the present invention may also be utilized in numerous other applications. For example, as shown in FIG. 6, the present invention can be utilized for precision control of a voltage controlled oscillator in a phase locked loop. In this embodiment the jitter and noise normally present in the output of a phase locked loop can be radically reduced. In this arrangement, the output signal from a voltage controlled oscillator 200 labeled CLKVCO is provided along with a signal CLKIN to slip detector 50.

Slip detector 50 is also provided with signal MCLK which is the microprocessor clock for a microprocessor based microcomputer 210. Slip detector 50 operates as previously described and provides signal SLIP as well as signal CLKIN>CLKVCO to a counter 212. Counter 212 counts either up or down depending upon the value of CLKIN greater than CLKVCO. Counter 212 counts for a predetermined period of time determined by timer 214 which interrupts microcomputer 210 after this predetermined period of time. Microcomputer 210 then reads the output of counter 212 to determine how many slips have occurred over the time period generated by 214. This gives microcomputer 210 a long term average representation of how far off frequency voltage controlled oscillator 200 is running and is able to correct the frequency accordingly. That is, microcomputer 210 knows that over the time period of timer 214 the VCO 200 is operating out of synchronization with CLKIN by a total of plus or minus the count of counter 212 in clock cycles. From this information, microcomputer 210 can generate an error number used to control a controlled voltage source 216 which can then apply an error signal to VCO 200. This error signal is typically a DC voltage which provides correction to the voltage controlled oscillator's frequency. By utilizing this arrangement, VCO 200 makes corrections to its output frequency on a less frequent interval than is normal for a phase locked loop. The corrections are made based upon a long term average error. This results in substantially less jitter and noise generated by the voltage controlled oscillator. Also, stability of the present circuit is guaranteed, unlike the case of some phase locked loops. It should be noted, however, that the above approach provides only frequency locking and does not provide phase locking. However, frequency locking is adequate for many situations and phase locking can be provided in addition to use of the present invention with anticipated improvement in jitter reduction and stability.

Those skilled in the art will appreciate that many variations in the arrangement shown in FIG. 6 are possible. For example, analogous implementations may be generated for control of a digital phase locked loop. Other variations and modifications as well as other uses for slip detector 50 will occur to those skilled in the art.

Thus it is apparent that in accordance with the present invention, a method that fully satisfies the aims, advantages and objectives is set forth above. While the invention has been described in conjunction with specific embodiments, it is evident that many alternatives, modifications and variations will become apparent to those skilled in the art upon consideration of the foregoing description. Accordingly, it is intended that the present invention embrace all such alternatives, modifications and variations as fall within the spriit and broad scope of the appended claims.

What is claimed is:

1. An apparatus for use in compensating for differences in frequency between a first clock and a second clock, the apparatus comprising in combination:
    slip detector means for determining when a complete one cycle slip has occurred between said first and said second clocks;
    clock compensation means for compensating for differences in said clock frequencies responsive to said slip detector means;
    means for counting the number of slips detected by said slip detector;
    means for detecting a period of silence in a plurality of samples of voice; and
    means for adding samples of voice during said period of silence if said second clock is running too fast relative to said first clock, and for deleting samples of voice if said second clock is running too slow relative to said first clock.

2. The apparatus of claim 1, further comprising means for mapping a predetermined number of clock slips K to a predetermined number of voice samples M so that said means for deleting and adding deletes or adds M voice samples for each K clock slips.

3. The apparatus of claim 1, wherein samples which are deleted are samples of silence.

4. The apparatus of claim 1, wherein samples which are added are samples of silence.

5. A method for compensating for differences in a first clock signal's rate and a second clock signal's rate, the method comprising the steps of:
    transmitting voice samples from a first location synchronized to said first clock signal;
    receiving said samples at a second location having a second clock for generating said second clock signal;
    comparing said first clock signal and said second clock signal to determine when a slip of one cycle has occurred;
    determining which of said first and second clock rates is greatest;
    at said second location, discarding a received voice sample for each predetermined number of slips which occur if said second clock is running too slow relative to said first clock; and
    at said second location, inserting an additional voice sample for each predetermined number of slips which occur if said first clock rate is smaller than said second clock rate.

6. The method of claim 5, wherein said discarded voice sample includes a sample of silence.

7. The method of claim 5, wherein said inserted voice sample includes a sample of silence.

8. The method of claim 5, further including the step of detecting periods of silence and wherein said inserted and discarded voice samples include samples of silence.

9. An apparatus for compensating for differences in a first clock signal's rate and a second clock signal's rate, the apparatus comprising:
    means for transmitting voice samples from a first location synchronized to said first clock signal;
    means for receiving said samples at a second location having a second clock for generating said second clock signal;

means for comparing said first clock signal and said second clock signal to determine when a slip of one cycle has occurred;
means for determining which of said first and second clock rates is greatest;
at said second location, means for discarding a received voice sample for each predetermined number of slips which occur if said first clock rate is greater than said second clock rate; and
at said second location, means for inserting an additional voice sample for each predetermined number of slips which occur if said second clock is running too fast relative to said first clock.

* * * * *